April 3, 1934.    W. E. WILSON    1,953,145
CONNECTION FOR STRUCTURAL UNITS
Filed Sept. 28, 1931
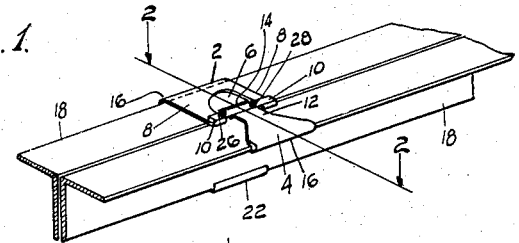
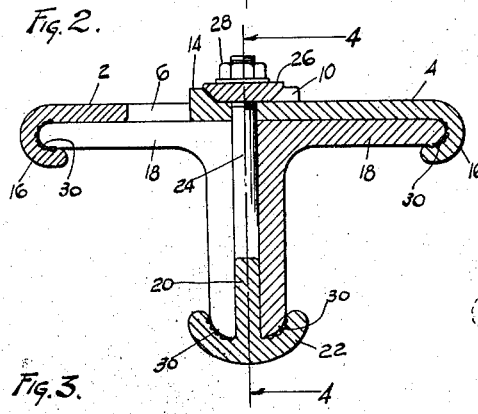
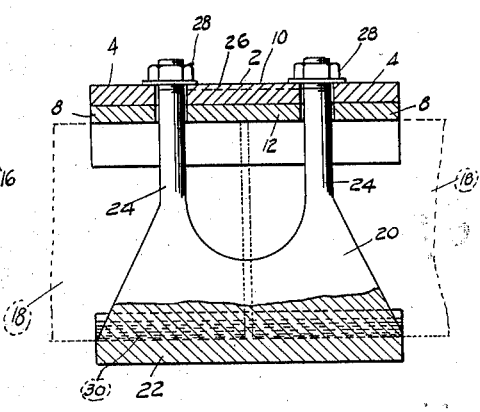
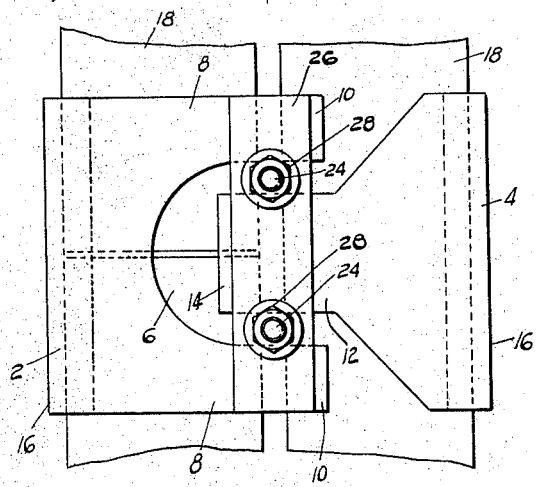
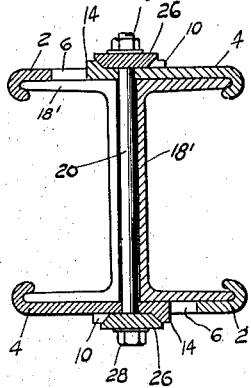
Inventor
W. E. WILSON
By Fred D. Hayn
Attorney Patented Apr. 3, 1934

1,953,145

UNITED STATES PATENT OFFICE 1,953,145

CONNECTION FOR STRUCTURAL UNITS

Winfred E. Wilson, Los Angeles, Calif.

Application September 28, 1931, Serial No. 565,568

6 Claims. (Cl. 189—36)

My invention relates to connecting devices and more particularly to such devices that are adapted for special use in connection with structural members or units, such as arch ribs and trusses, girders, I beams, angle irons, channel irons and the like, whereby said members or units may be quickly assembled and disassembled, affording a simple, light, rigid and economical construction, and at the same time one of maximum strength.

It accordingly is an object of my invention to provide a novel form of device comprising a plurality of members adapted for relative movement, with which members are associated, a means preferably in the form of a suitable wedge adapted to coact with at least two of said members for obtaining said relative movement, and at least one means, such, for example, as a screw threaded member coacting with said wedge for holding all of said members in secured and detachable relation.

The above, and further objects and advantages of my invention, as will hereinafter more fully appear, I attain by the construction described in the specification and illustrated on the drawing, forming a part of my application.

Reference is had to the accompanying drawing, in which similar reference characters denote similar parts. In the drawing, Fig. 1 is a fragmentary perspective view of my invention, illustrating one way in which said invention may be applied in practice, Fig. 2 is an enlarged cross-sectional view, taken on the line 2—2, Fig. 1, Fig. 3 is a top plan view of Fig. 1, on an enlarged scale, Fig. 4 is a cross-sectional view, taken on the line 4—4, Fig. 2, and Fig. 5 is a cross-sectional view, on a somewhat reduced scale, of another form of my invention.

Describing my invention more in detail, in its broader aspects said invention comprises a set of movable members of the clamping type, and preferably provided with a suitable anti-slipping means, means being associated with at least two of said members whereby a relative movement may be had between all of said members, means, such as at least one screw-threaded member, being also provided to hold all of said members in secured and detachable relation.

More specifically, my invention comprises a pair of movable members 2 and 4, and which may be respectively of the female and male type, the member 2 being provided with a cut-out portion 6, defining a pair of legs 8, upon the outer ends of which may be positioned the wedge engaging projections 10.

The male member 4 is provided with an extension 12, adapted to be projected within the opening or cut away portion 6, and is also provided with a wedge engaging projection 14, and each of the members 2 and 4 is provided with a suitable clamping portion 16 for engaging the edges of the structural units or members 18.

A third member 20, of suitable construction, and equipped with the clamping portion 22, may be provided to engage the other ends of the units 18, and said third member 20 may be provided with one or more screw-threaded extensions 24, either integral therewith or associated therewith in any manner in practice desired.

To engage the projections 10 and 14, a wedge 26 is provided, which wedge is adapted to cause a relative movement of the members 2, 4 and 20, when the nut or nuts 28 are screwed home, causing said wedge to coact with the projections 10 and 14 to cause said members to be moved relatively to adjust the tightness of the clamps 16 and 22. If desired, the inner portions of said clamp may be serrated or roughened as indicated by the reference numeral 30, to provide an anti-slipping means, which may be omitted, if preferred.

Said construction may be used for splicing, as indicated in Fig. 3, and may be used upon any structural unit in practice desired, of vertical, horizontal, or angular form, or positioned in any preferred place, and to connect any such units, with but slight variation.

Fig. 5 shows a modification of my invention, especially useful in connection with channel irons. In said figure the channel irons 18' have associated therewith the members 2 and 4, of identical construction as that previously described, the wedge 26 functioning precisely as in the other form of my invention, the modification residing in the duplication of said members and wedge, as shown in said figure, the securing means 20 extending entirely through said wedges, and may be distinct and separate therefrom, if desired. If preferred, also, the anti-slipping means 30, shown in Figure 2, may be omitted.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. An article of manufacture comprising a pair of inter-connected male and female members having downwardly extending end clamping portions, a third vertical member having one end extending past both of said members, an inwardly extending clamp on said third member, a wedge associated with all of said members, and means for moving said wedge to actuate said members in a plurality of directions.

2. In a device of the class described, a pair of transverse interconnected members, a downwardly extending clamp on one end of each of said members, and an upwardly extending tapered projection on the other end of each of said members, a third member, a shank on said third member, an upwardly extending clamp on one end of said shank, the other end of said shank extending past both of said first named members, a wedge on said shank and adapted to engage said projections, and an adjustable nut for causing said wedge to move all of said members in a plurality of directions.

3. A connection for clamping together structural units comprising a pair of relatively movable transverse members, one of which is provided with a cut out portion and the other with an extension adapted to move within said cut out portion, a clamp on each end of each of said members adapted to engage said units, a third member having at least one clamping portion, also adapted to engage said units, means engaging said transverse members for producing relative movement between said transverse members, and means associated with said third member and extending past said transverse members for actuating said members in a plurality of directions.

4. A connection for clamping together structural units comprising a pair of inter connected relatively movable members, each having a clamping portion on one end thereof, adapted to engage said units, a third member relatively movable to said pair of members, a wedge extending across the other ends of said pair of members, said other ends being provided with wedge engaging portions, and adjustable means extending past said pair of members and through said wedge for actuating all of said members in a plurality of directions.

5. A connection adapted for use in clamping together angle irons comprising a pair of inter-connected transversely movable members each having clamping portions at one end thereof for engaging two aligned ends of said angle irons, a third member having clamping portions for engaging two parallel ends of said angle irons, and plural means extending past said transversely movable members, and including means for engaging the inner ends of said transversely movable members whereby said members may be actuated in a plurality of directions.

6. A connection for clamping together channel irons, comprising a first pair of inter-connected relatively movable transverse members for clamping together two aligned portions of said channel irons, a second pair of inter-connected relatively movable transverse members for clamping the other aligned ends of said channel irons, and adjustable means positioned between said channel irons for causing a relative movement between all of said members, said means including a wedge means associated with each pair of said members.

WINFRED E. WILSON.